US011220645B1

(12) United States Patent
Harvey (10) Patent No.: US 11,220,645 B1
(45) Date of Patent: Jan. 11, 2022

(54) RENEWABLE HIGH CETANE DIOXOLANE FUELS

(71) Applicant: The United States of America, as Represented by the Secretary of the Navy, Arlington, VA (US)

(72) Inventor: Benjamin G. Harvey, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/675,940

(22) Filed: Nov. 6, 2019

Related U.S. Application Data

(60) Provisional application No. 62/756,994, filed on Nov. 7, 2018.

(51) Int. Cl.
*C10L 1/18* (2006.01)
*C10L 1/185* (2006.01)

(52) U.S. Cl.
CPC .................. *C10L 1/1855* (2013.01)

(58) Field of Classification Search
CPC ................................................... C10L 1/1855
See application file for complete search history.

(56) References Cited

U.S. PATENT DOCUMENTS

| | | | | |
|---|---|---|---|---|
| 4,390,345 | A * | 6/1983 | Somorjai | C10L 1/14 44/352 |
| 4,792,411 | A * | 12/1988 | Walsh | C10L 1/224 508/308 |
| 10,711,215 | B1 * | 7/2020 | Harvey | C10L 10/10 |
| 2010/0108567 | A1 | 5/2010 | Medoff et al. | |
| 2014/0238841 | A1 | 8/2014 | Kawamura et al. | |
| 2015/0113860 | A1 * | 4/2015 | De Angelis | C07D 317/22 44/352 |

OTHER PUBLICATIONS

Harrison et al. ,High Cetane Renewable Diesel Fuels Prepared from Methyl Ketones and Diols, 2017, The Royal Society of Chemistry NMR Spectrums (Year: 2017).*
2-nonanone propylene glycol acetal, TGSC Information System (Date unknown).*
Gibka, Odor Characteristics of Aliphatic Metameric C-13 Ketones, Alcohols and Their Derivatives, 2004, Perfumer and Flavorist, 42, 44-46. (Year: 2004).*
Broekhuis et al., Recovery of Propylene Glycol from Dilute Aqueous Solutions via Reversible Reaction with Aldehydes, Dec. 1993.
Ewing et al., Optical and geometrical isomers of some fatty acids with vicinal hydroxy groups, Canadian Journal of Chemistry, vol. 45, 1259 (19670).
Organic Synthesis (Chapter 7), pp. 587-622, 2010.

* cited by examiner

Primary Examiner — Cephia D Toomer
(74) Attorney, Agent, or Firm — Naval Air Warfare Center Weapons Division; Matthew D. Pangallo; Stuart H. Nissim (57) ABSTRACT

A biodiesel fuel consisting of a dioxolane with one to three alkyl groups, a $(CH_2)_nCH_3$ alkyl group where n ranges from 6 to 14, and the dioxolane has a total number of carbons that is equal to or less than 24 carbons.

6 Claims, 9 Drawing Sheets

RENEWABLE HIGH CETANE DIOXOLANE FUELS

CROSS-REFERENCE TO RELATED APPLICATIONS

This is a non-provisional application claiming the benefit of the parent provisional application Ser. No. 62/756,994 filed on Nov. 7, 2018. The entire disclosure of the parent provisional application Ser. No. 62/756,994 is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

Fuel precursors can be chemically produced from any fuel source or obtained from naturally occurring crude oil sources. When producing fuel from crude oil sources, a complex mixture of hydrocarbons is added to a distillation column with a temperature gradient to separate the molecules based on their molecular weight and volatility. Isolation of a well-defined distillation cut allows for the production of various fuel blends with properties suitable for use in specific applications. For example, jet fuel may contain a mixture of hydrocarbons having between 9 to 14 carbon atoms in each molecule.

BRIEF DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Conventional biodiesel fuel is defined as fatty acid methyl esters (FAME) that are prepared by transesterification of triglycerides with methanol. FAMEs are used in diesel engines or blended with petroleum diesel fuel in amounts of up to 20%. While FAMEs reduce emissions of unburned hydrocarbons, carbon monoxide, and particulate matter, they have a higher viscosity, lower volumetric net heat of combustion, and are more likely to cause biofouling and corrosion when compared to conventional, petroleum-based diesel fuels. In addition, FAMEs are produced from food sources (e.g., soybean or rapeseed oil) or grown from sources in tropical climates (e.g., palm, jatropha oil). As a result, these sources are not sufficient for the production of industrial scale quantities of FAMEs, which limits the potential for using conventional biodiesel fuel as an alternative to petroleum-based diesel fuel.

In the invention herein, a biodiesel fuel is produced from lignocellulosic biomass. Lignocellulosic biomass can be produced in significant quantities from sources such as agricultural residues, municipal solid waste, and forest resources. As a result, biodiesel fuel produced from lignocellulosic biomass has the potential to replace significant quantities of petroleum-based diesel fuel. In addition, the biodiesel fuels produced herein have increased cetane numbers, reduced emissions, and improved combustion efficiency compared to conventional biodiesel fuel.

In the invention herein, a biodiesel fuel is produced consisting of a dioxolane with one to three alkyl groups, a $(CH_2)_nCH_3$ alkyl group where n ranges from 6 to 14, and the dioxolane has a total number of carbons that is equal to or less than 24. The biodiesel fuel is produced by reacting alkyl ketones with diols or polyols in the presence of an acid catalyst to generate a mixture that includes the dioxolane. Water produced in the reaction is removed as the reaction proceeds. The mixture is purified to generate the dioxolane as the biodiesel fuel.

First, an alkyl ketone is reacted with diols or polyols in the presence of an acid catalyst to generate a mixture including the dioxolane compound. This reaction may occur at temperatures ranging from about 20° C. to about 80° C. The alkyl ketone and diols or polyols are present in an equimolar ratio of alkyl ketone to the diol or polyol of about 1 to 1.2. In some examples, combinations of diols or polyols may be added to the reaction to generate a mixture of dioxolanes. In another example, combinations of alkyl ketones may be added to the reaction to generate a mixture of dioxolanes.

In an example, the alkyl ketone is generated from biomass feedstock. The alkyl ketones can be produced through a fermentation process from the biomass feedstock. Some examples of the feedstock include glucose, sucrose, other reducing sugars, cellulose, hemicellulose, lignocellulose, lignin, and combinations thereof. Some examples of the alkyl ketones produced, which are used in the reaction with the diols or polyols, include 2-undecanone, 2-tridecanone, 2-pentadecanone, or combinations thereof. In another example, the alkyl ketones may be any alkyl ketones having carbon atoms ranging from 8 carbons to 16 carbons.

The diol or polyols may also be generated from biomass feedstock. The diols or polyols may be produced through a fermentation process from the biomass feedstock. Some examples of the feedstock include glucose, sucrose, other reducing sugars, cellulose, hemicellulose, lignocellulose, lignin, and combinations thereof. Some examples of the polyol or diol include 2,3-butanediol, 1,2-propanediol, ethylene glycol, glycerol, or combinations thereof.

The acid catalyst may be produced using any known methods. Some examples of the acid catalyst include sulfuric acid, para-toluene sulfonic acid, other sulfonic acids including AMBERLYST® and NAFION®, acid clays, alumina-silica catalysts, zeolites, or combinations thereof.

During the reaction between the alkyl ketone and the diol or polyol, water is produced as a byproduct. The water can be removed during the reaction using any known methods. For example, the water can be removed by azeotropic distillation using a solvent, such as benzene or toluene. In another example, the water may be removed by contacting the reaction mixture with molecular sieves or other dessicants.

After the first reaction, the mixture that is formed may be purified to form the biodiesel fuel. Prior to purification, the mixture may include a single type of dioxolane or a mixture of different dioxolanes with impurities. The impurities that are removed from the mixture include solvents (if used), residual diols or polyols used in the previous reaction, or unreacted alkyl ketones, if added to the previous reaction. Any known methods may be used to remove the impurities. In an example, fractional distillation may be used to purify the mixture to form the biodiesel fuel. The fractional distillation may occur at a reduced pressure (e.g., 1 Torr) at temperatures ranging from about 70° C. to about 100° C. for a first cut and greater than 100° C. for a second cut. The final dioxolane biodiesel fuel produced is equal to or greater than 90% dioxolanes to form the biodiesel fuel.

The biodiesel fuels produced herein consist of a dioxolane. The dioxolane has the following structure (I):

where R is an alkyl group, R' and R" are alkyl groups or hydrogens, n ranges from 6 to 14, and the dioxolane has a total number of carbons that is equal to or less than 24 carbons. In some examples, R is a methyl or ethyl group. In another example, the dioxolane has a total number of carbons ranging from 9 carbons to 24 carbons. Some specific examples of dioxolanes include 2,4,5-trimethyl-2-undecyl-1,3-dioxolane, 2,4-dimethyl-2-undecyl-1,3-dioxolane, 2-methyl-2-undecyl-1,3-dioxolane, and combinations thereof. The biodiesel fuel has a cetane number ranging from about 40 to about 100. The biodiesel fuel also has a freezing point ranging from about −60° C. to about 0° C. The biodiesel fuel also has a net heat of combustion ranging from about 110000 Btu/gal (30.6 MJ/L) to about 130000 Btu/gal (36.2 MJ/L).

In some examples, the biodiesel fuel described herein can be blended with another fuel to form a blended biodiesel fuel. The other fuel may be a second biodiesel fuel where the second biodiesel fuel is any known biodiesel fuel. In another example, the other fuel may be any known petroleum-based diesel fuel. The biodiesel fuel herein may be present in the blended fuel in an amount ranging from about 1% to about 50% based on the total % of the blended fuel. The blended fuel may have a cetane number ranging from about 40 to about 70.

To further illustrate the present disclosure, examples are given herein. These examples are provided for illustrative purposes and are not to be construed as limiting the scope of the present disclosure.

EXAMPLES

For the example data, NMR spectra were collected with a Bruker Avance II 300 MHz NMR spectrometer. $^1$H and $^{13}$C NMR chemical shifts are reported versus the deuterated solvent peak [CDCl$_3$: δ 7.27 ppm ($^1$H), 77.23 ppm ($^{13}$C)]. GC/MS was performed on an Agilent Technologies 6890N network GC system with a 5973 mass selective detector. The net heats of combustion of dioxolane fuels were measured using ASTM D240N. Viscosity measurements were performed with a Brookfield Engineering DV-II+ Pro viscometer equipped with the small sample adapter. The dynamic viscosities of the fuel samples were converted to kinematic viscosities at −20° C. and 40° C. by calculating the densities of the fluids at those temperatures. The derived cetane numbers (DCNs) of fuels were measured by ignition quality testing (IQT) using ASTM D6890. Differential scanning calorimetry (DSC) experiments were performed on a TA Instruments Q100 differential scanning calorimeter. Sample sizes were between 2-10 mg and the temperature was ramped from −80° C. to 50° C., decreased to −80° C. and then increased to 50° C., all at 10° C. min$^{-1}$.

Example 1: Synthesis of 2,4,5-trimethyl-2-undecyl-1,3-dioxolane

2-Tridecanone (120 g, 0.605 mol), 2,3-butanediol (54.52 g, 0.605 mol), and PTSA monohydrate (6.00 g, 31.54 mmol) were combined in a flask with benzene (100 mL). The mixture was heated to reflux and water produced in the reaction was collected in a Dean-Stark trap. The reaction proceeded until 10.9 mL of water was collected. Upon cooling, the reaction mixture was washed with water, a 10% sodium bicarbonate solution, and brine. The organic layer was then dried over MgSO$_4$ and the solvent was removed under reduced pressure. Fractional vacuum distillation under reduced pressure (1 Torr) yielded a first broad cut distilling between 70° C. and 100° C. A second cut distilling at 101° C. was collected and was 97% pure 2,4,5-trimethyl-2-undecyl-1,3-dioxolane by GC/MS. The isolated yield of the preparation was 88.5%.

Figure 1:
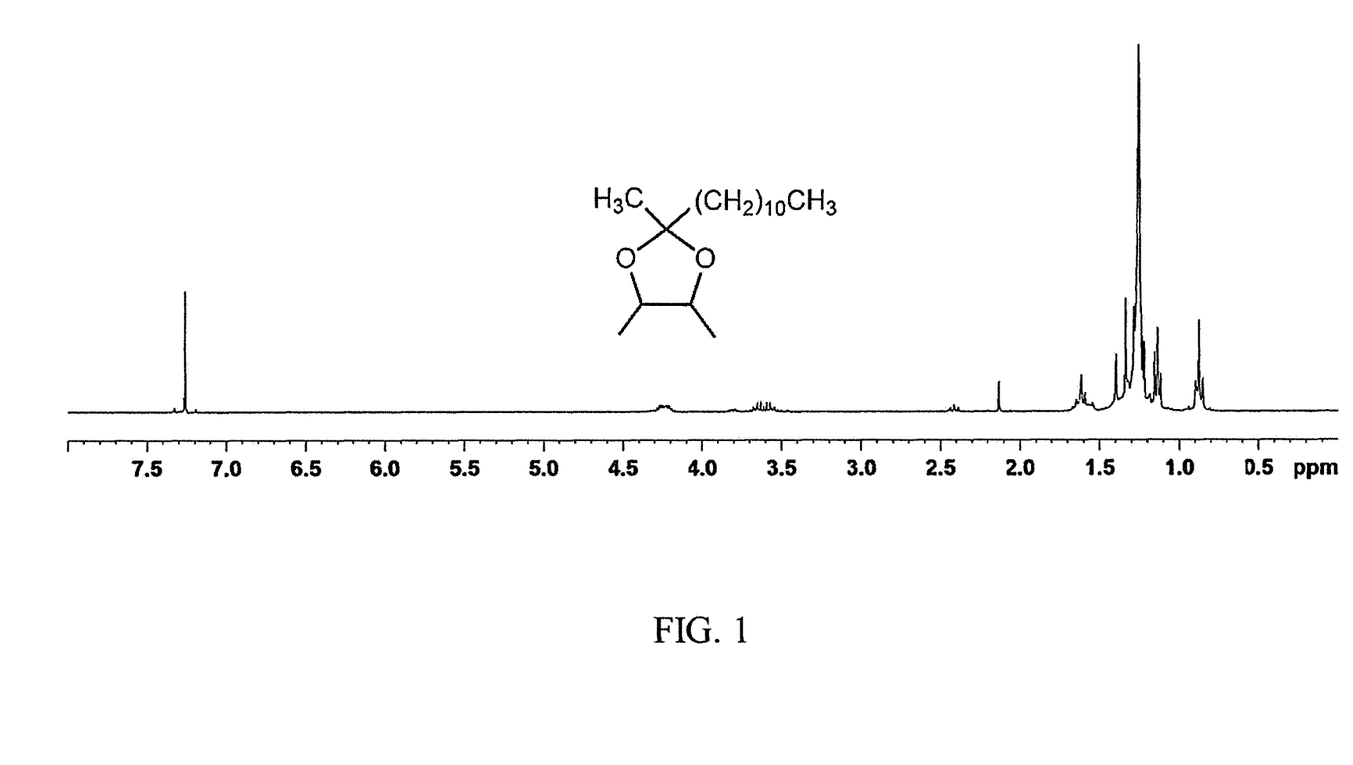
FIG. 1 is a $^1$H NMR spectrum of 2,4,5-trimethyl-2-undecyl-1,3-dioxolane.
Figure 2:
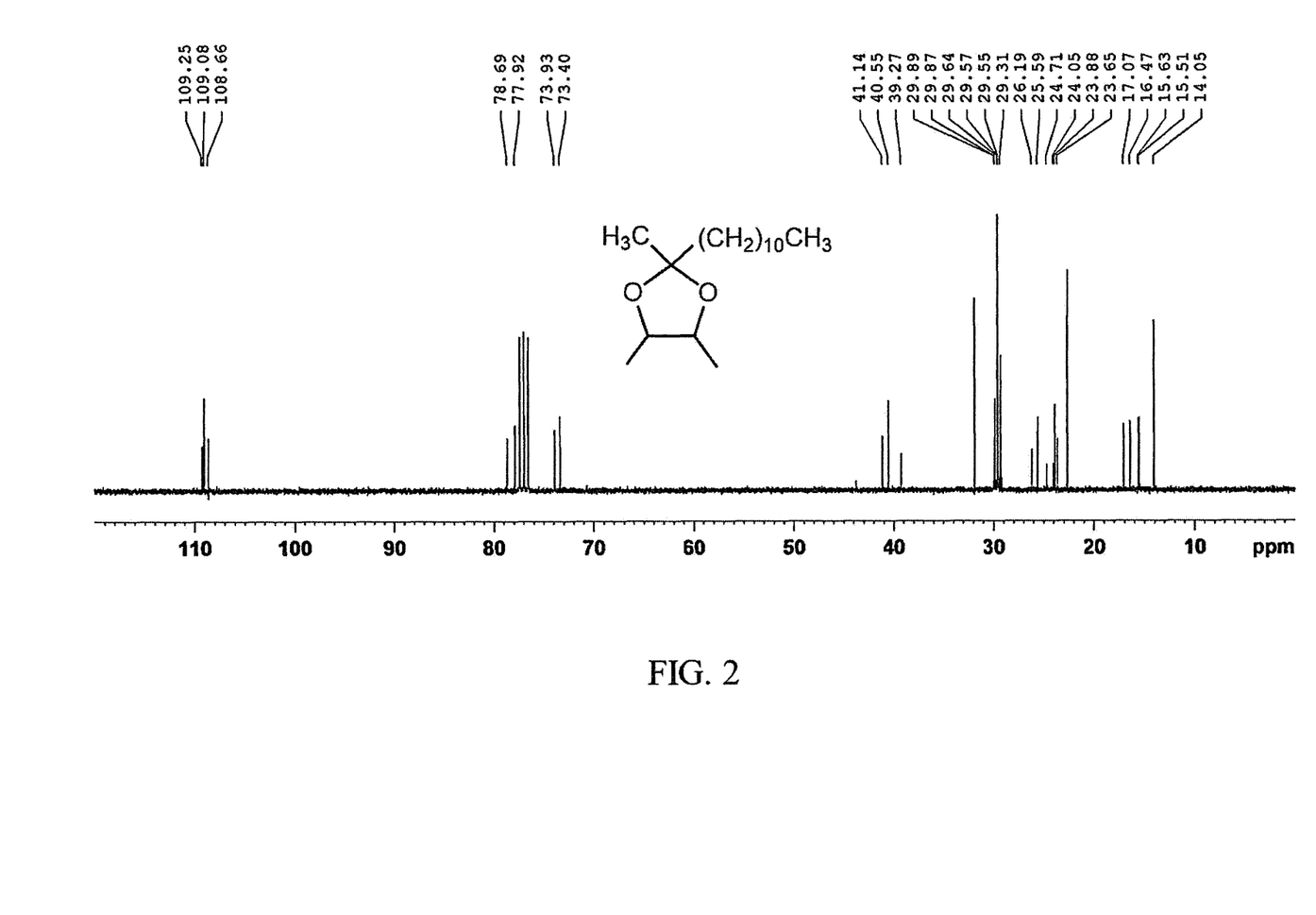
FIG. 2 is a $^{13}$C NMR spectrum of 2,4,5-trimethyl-2-undecyl-1,3-dioxolane.

FIG. 1 shows the $^1$H NMR spectrum of 2,4,5-trimethyl-2-undecyl-1,3-dioxolane. FIG. 2 shows the $^{13}$C NMR spectrum of 2,4,5-trimethyl-2-undecyl-1,3-dioxolane. $^1$H NMR (CDCl$_3$) δ 4.28-4.19 (m, 1H), 3.70-3.46 (m, 1H), 1.67-1.54 (m, 2H), 1.39 (s, 1H), 1.33 (s, 3H) 1.25 (bs, 20H), 1.15-1.12 (m, 3H), 0.90-0.85 (m, 3H). Analytically Calculated for C$_{17}$H$_{34}$O$_2$: C, 75.50; H, 12.67 Found: C, 75.41; H, 12.74.

Example 2: Synthesis of 2,4-dimethyl-2-undecyl-1,3-dioxolane

2-Tridecanone (120 g, 0.605 mol), 1,2-propanediol (46.04 g, 0.605 mol), and PTSA monohydrate (6.00 g, 31.54 mmol) were combined in a flask with benzene (100 mL). The reaction and workup were conducted as described above in Example 1. A distillation cut was collected from 95° C. to 102° C. and was 97% pure by GC/MS. The isolated yield of the preparation was 50.8%.

Figure 3:
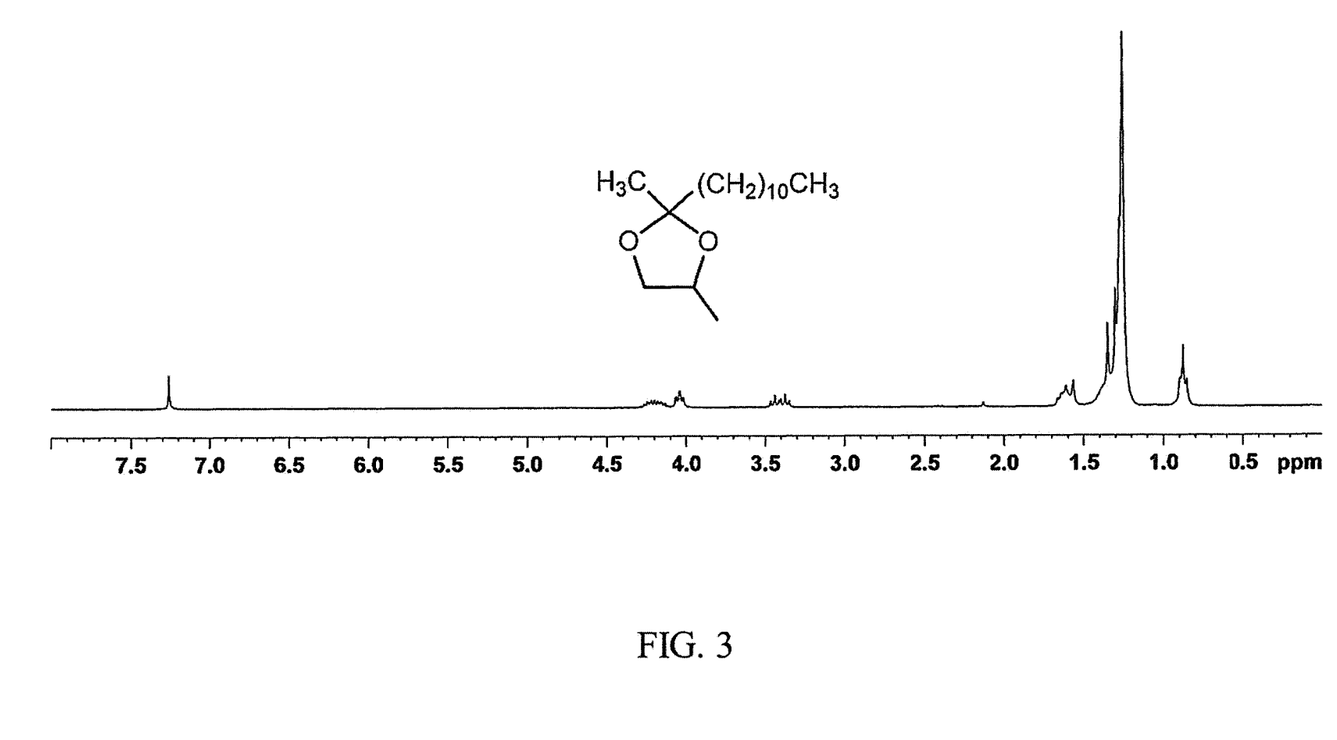
FIG. 3 is a $^1$H NMR spectrum of 2,4-dimethyl-2-undecyl-1,3-dioxolane.
Figure 4:
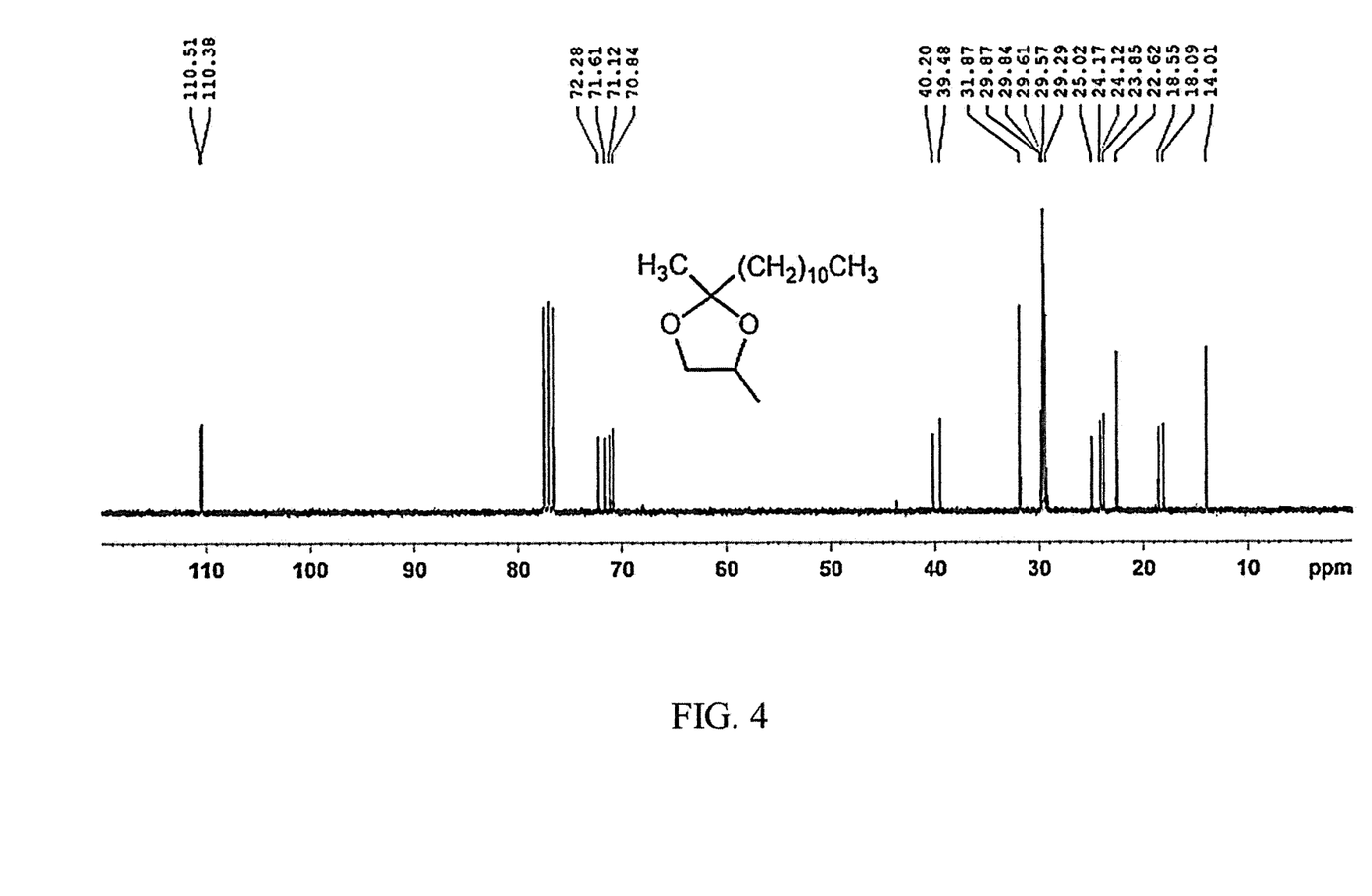
FIG. 4 is a $^{13}$C NMR spectrum of 2,4-dimethyl-2-undecyl-1,3-dioxolane.

FIG. 3 shows the $^1$H NMR spectrum of 2,4-dimethyl-2-undecyl-1,3-dioxolane. FIG. 4 shows the $^{13}$C NMR spectrum of 2,4-dimethyl-2-undecyl-1,3-dioxolane. $^1$H NMR (CDCl$_3$) δ 4.27-4.14 (m, 1H), 4.06-4.01 (m, 1H), 3.41 (dt, J=19.1, 7.9 Hz, 1H), 1.66-1.56 (m, 2H), 1.35-1.25 (m, 24H), 0.90-0.85 (m, 3H). Analytically Calculated for C$_{16}$H$_{32}$O$_2$: C, 74.94; H, 12.58. Found: C, 75.16; H, 12.75.

Example 3: Synthesis of 2-methyl-2-undecyl-1,3-dioxolane 2-tridecanone (120 g, 0.605 mol), ethylene glycol (37.55 g, 0.605 mol), and PTSA monohydrate (6.00 g, 31.54 mmol) were combined in a flask with benzene (100 mL). The reaction and workup were conducted as described above in Example 1. A distillation cut was collected from 92° C. to 98° C. and was 95% pure by GC/MS. The isolated yield of the preparation was 50.5%.

Figure 5:
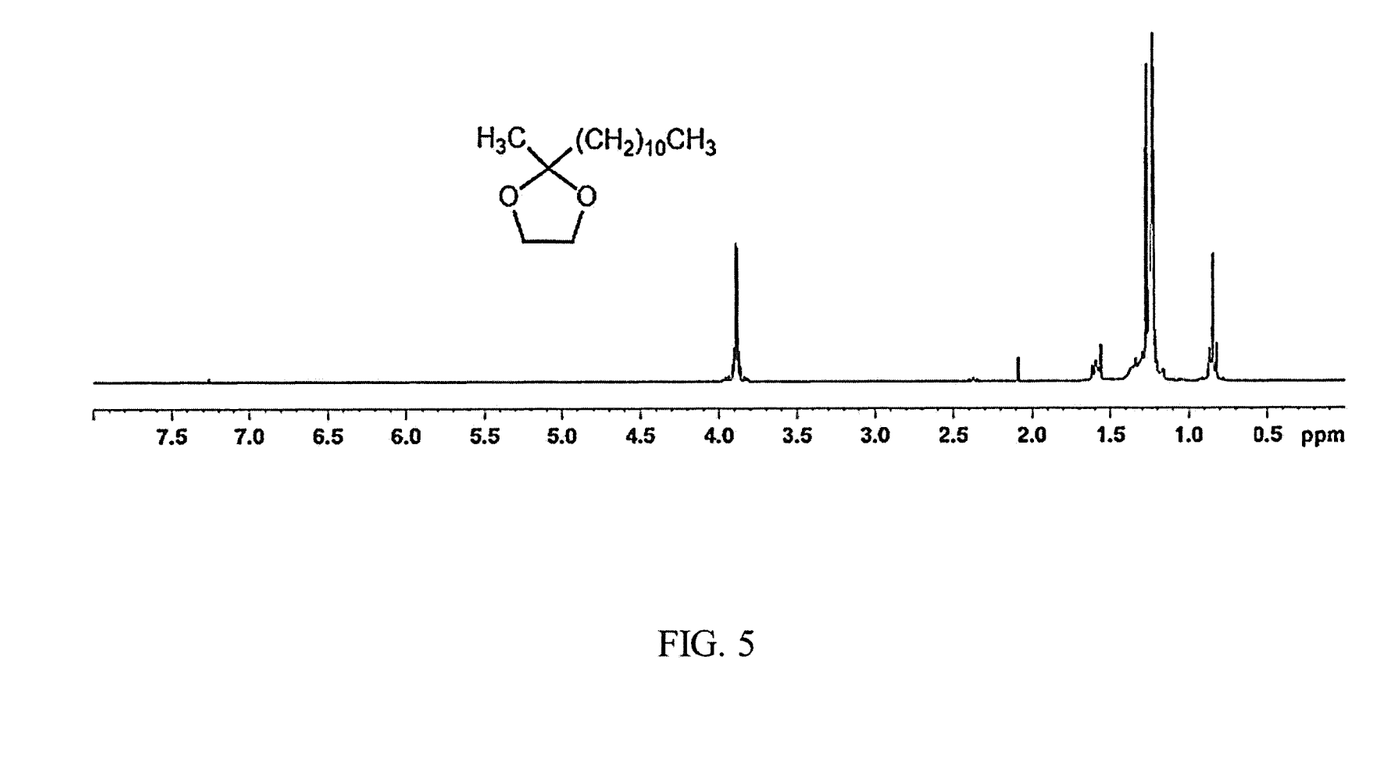
FIG. 5 is a $^1$H NMR spectrum of 2-methyl-2-undecyl-1,3-dioxolane.
Figure 6:
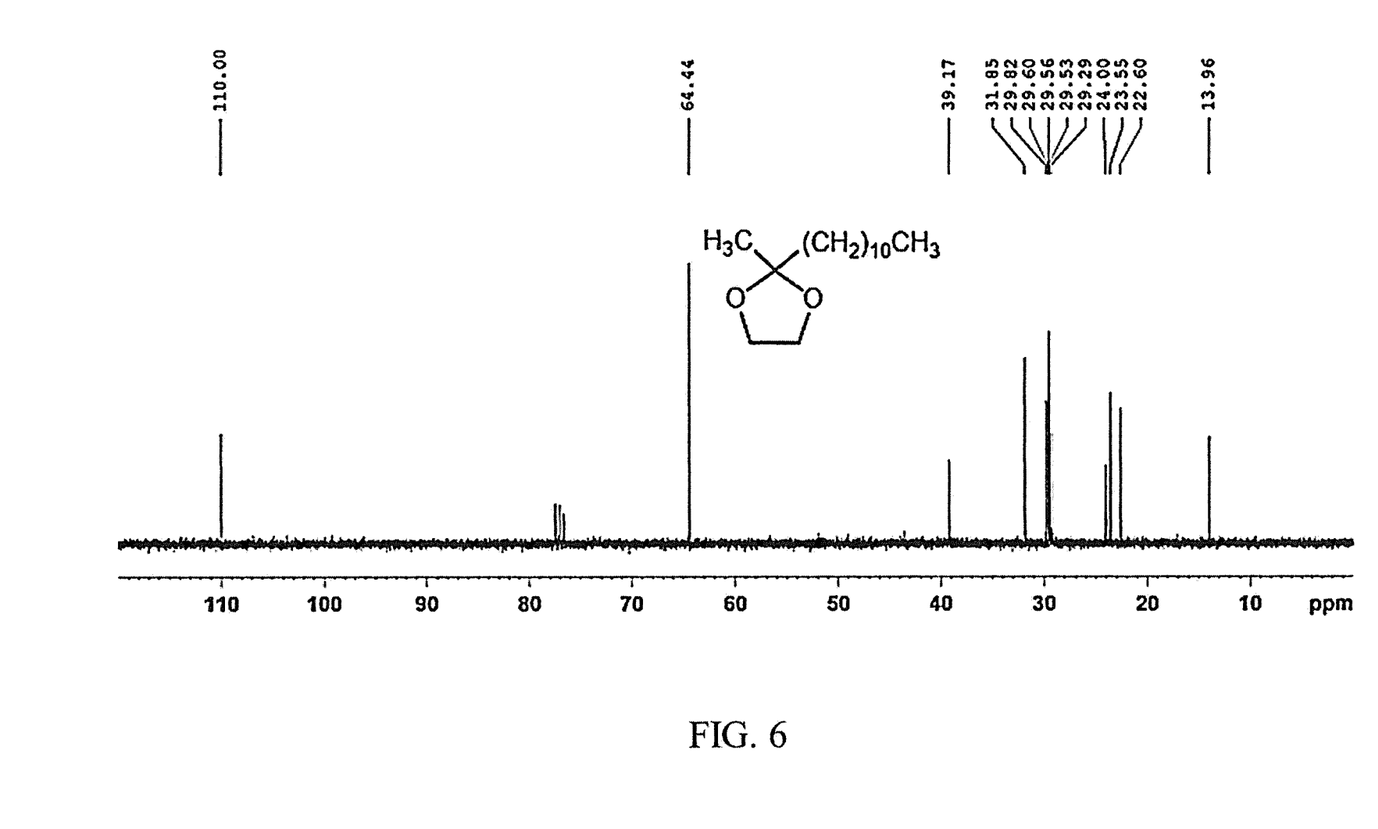
FIG. 6 is a $^{13}$C NMR spectrum of 2-methyl-2-undecyl-1,3-dioxolane.

FIG. 5 shows the $^1$H NMR spectrum of 2-methyl-2-undecyl-1,3-dioxolane. FIG. 6 shows the $^{13}$C NMR spectrum of 2-methyl-2-undecyl-1,3-dioxolane. $^1$H NMR (CDCl$_3$) δ 3.99-3.78 (m, 4H), 1.61-1.53 (m, 2H), 1.43-1.13 (bs, 21H), 0.87-0.82 (m, 3H). Analytically Calculated for C$_{15}$H$_{30}$O$_2$: C, 74.32; H, 12.47. Found: C, 74.55; H, 12.61.

Example 4: Fuel Properties

Figure 7:
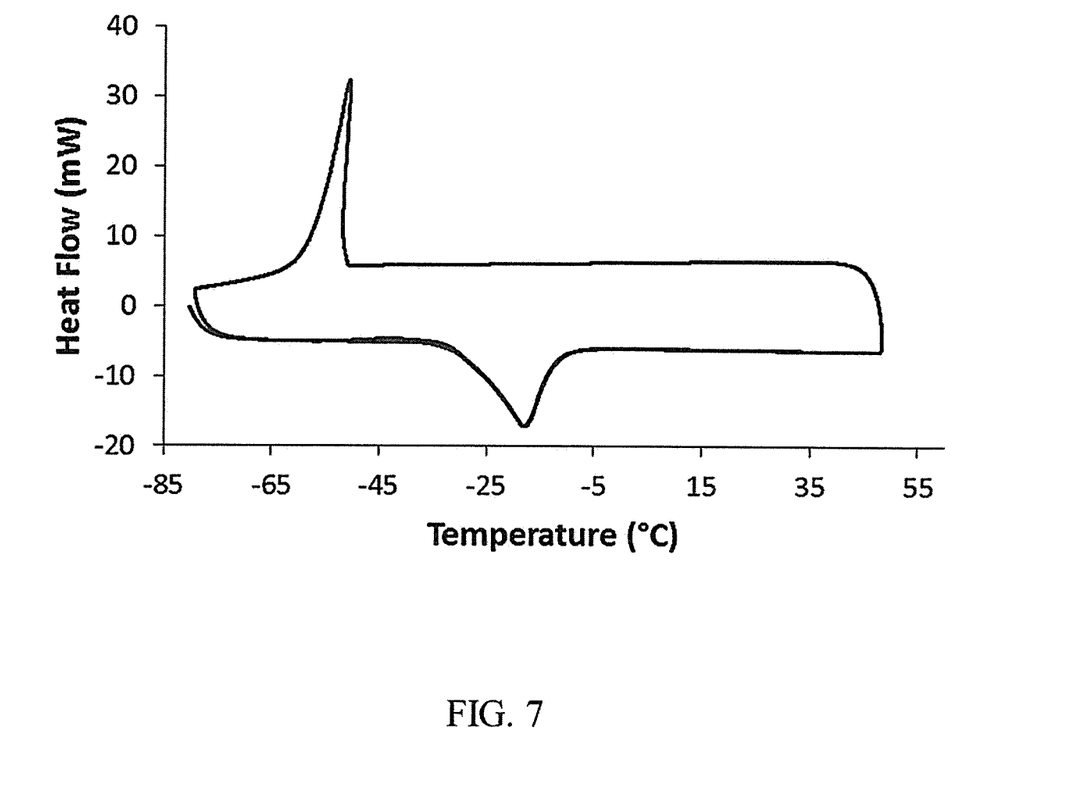
FIG. 7 is a plot of the temperature (X-axis, labeled "Temperature (° C.)") vs. the heat flow (Y-axis, labeled "Heat flow (mW)") showing differential scanning calorimetry data for 2,4,5-trimethyl-2-undecyl-1,3-di oxolane.
Figure 8:
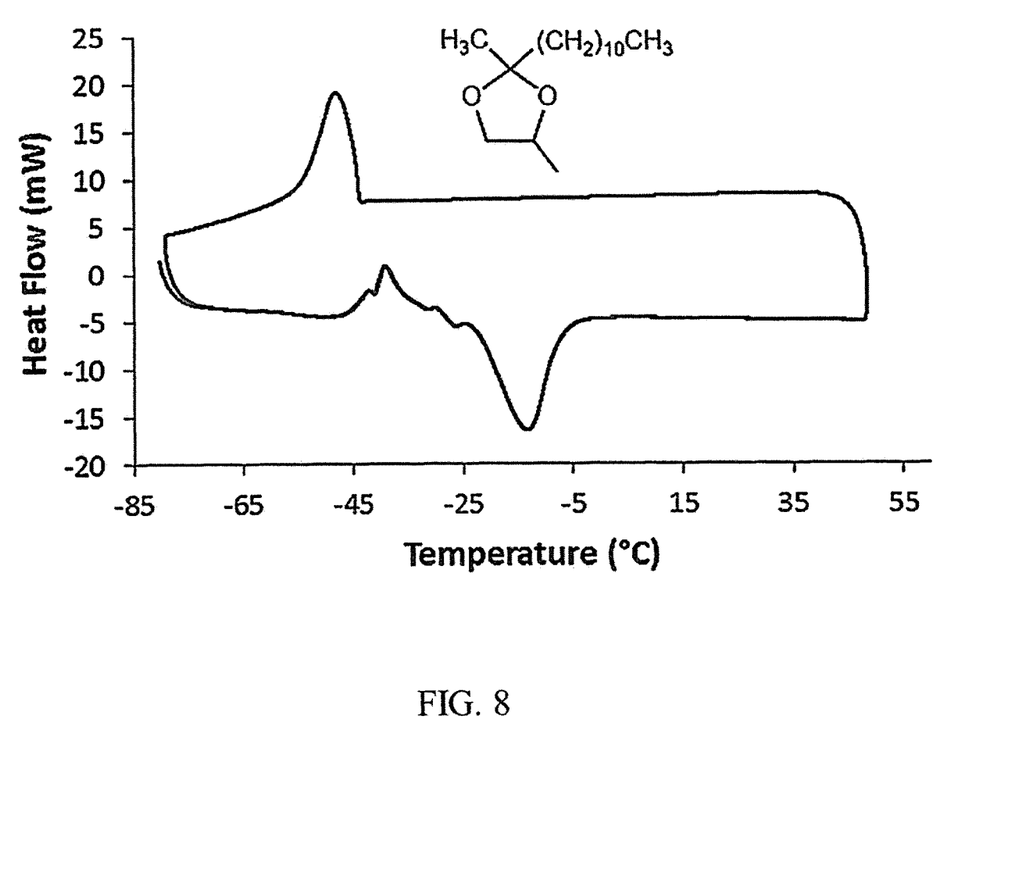
FIG. 8 is a plot of the temperature (X-axis, labeled "Temperature (° C.)") vs. the heat flow (Y-axis, labeled "Heat flow (mW)") showing differential scanning calorimetry data for 2,4-dimethyl-2-undecyl-1,3-dioxolane.
Figure 9:
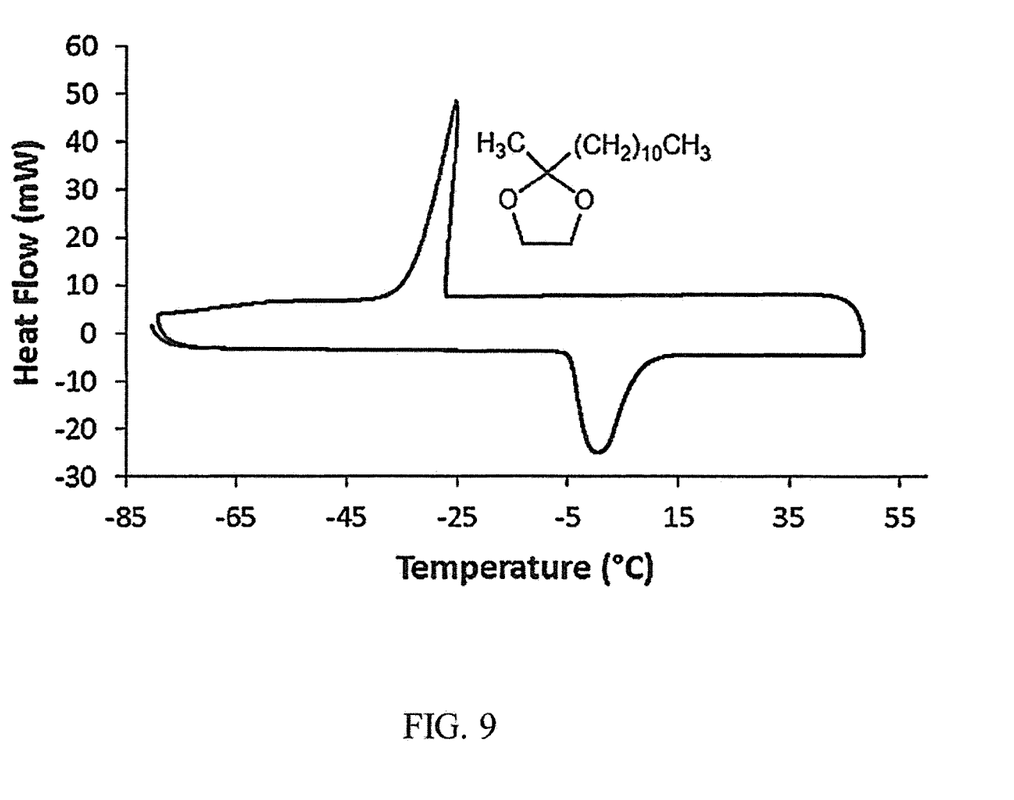
FIG. 9 is a plot of the temperature (X-axis, labeled "Temperature (° C.)") vs. the heat flow (Y-axis, labeled "Heat flow (mW)") showing differential scanning calorimetry data for 2-methyl-2-undecyl-1,3-dioxolane.

After establishing the purity of the dioxolanes, the key fuel properties of the three examples, including their densities, net heats of combustion (NHOC), viscosities, freezing/melting points, and derived cetane numbers (DCN) were measured, and are shown in Table 1. The densities of the dioxolane fuels are in the range of 0.87 g/mL to 0.88 g/mL and they all have similar NHOCs around 115 kBtu/gal. The dynamic viscosity of 2,4,5-trimethyl-2-undecyl-1,3-dioxolane and 2,4-dimethyl-2-undecyl-1,3-dioxolane was measured from −20 to 40° C., while that of 2-methyl-2-undecyl-1,3-dioxolane was measured from 0 to 40° C. due to its higher freezing point. The lowest viscosity at 40° C. was observed for 2,4,5-trimethyl-2-undecyl-1,3-dioxolane, due to the presence of several isomers and more chain branching than the other two dioxolanes. This trend was reversed at low temperatures, likely due to the higher molecular weight of 2,4,5-trimethyl-2-undecyl-1,3-dioxolane. 2,4,5-trimethyl-2-undecyl-1,3-dioxolane also had the lowest freezing and melting points as measured by DSC as shown in FIG. 7, FIG. 8, and FIG. 9. The derived cetane numbers for all three dioxolanes were above 80.

TABLE 1

Fuel properties of dioxolanes 1-3 and common biodiesels.

| Fuel | Density (g/mL) | NHOC (kBtu/gal) | Viscosity (40° C., mm$^2$/s)$^a$ | Freezing/ MP (° C.)$^b$ | DCN |
|---|---|---|---|---|---|
| 2,4,5-trimethyl-2-undecyl-1,3-dioxolane | 0.868 | 114.8 | 4.44 | −51/−18 | 84(2) |
| 2,4-dimethyl-2-undecyl-1,3-dioxolane | 0.872 | 114.8 | 5.15 | −48/−14 | 91(3) |
| 2-methyl-2-undecyl-1,3-dioxolane | 0.883 | 115.8 | 4.98 | −25/0 | 81(2) |
| Soy Biodiesel | 0.882 | 117.1 | 4.26 | 0, −4 (PP) | 51.3 |
| Palm Biodiesel | 0.873 | 116.8 | 4.61 | 14, 13 (PP) | 61.9 |
| Jatropha Biodiesel | 0.876 | 118.5 | 4.75 | 5, 0 (PP) | 55.7 |
| Winter Diesel | 0.826- | ~129 | 1.9-4.1 | <−3 (PP) | 40-54 |

TABLE 1-continued

Fuel properties of dioxolanes 1-3 and common biodiesels.

| Fuel | Density (g/mL) | NHOC (kBtu/gal) | Viscosity (40° C., mm$^2$/s)$^a$ | Freezing/ MP (° C.)$^b$ | DCN |
|---|---|---|---|---|---|
| (U.S.) | 0.859 | | | | |

$^a$The kinematic viscosities of each dioxolane were calculated from the dynamic viscosities.
$^b$Freezing and melting points were measured by DSC and are the maxima or minima of the respective peaks. PP is short for pour point.

The properties of each dioxolane can be compared with several conventional biodiesel fuels and petroleum-derived winter diesel shown in Table 1. The density and NHOCs of the dioxolane fuels are comparable to the biodiesel fuels, which would be expected based on the similarities in density and oxygen content between the fuels. Soy, palm, and jatropha-derived biodiesels have a lower percent oxygen content compared to the dioxolanes, which leads to the slightly higher NHOC values for the conventional fuels. The 40° C. viscosities of 2,4-dimethyl-2-undecyl-1,3-dioxolane and 2-methyl-2-undecyl-1,3-dioxolane are slightly higher than the conventional fuels, but the extra chain branching in 2,4,5-trimethyl-2-undecyl-1,3-dioxolane reduces the viscosity to a point that is lower than palm and jatropha biodiesel. The freezing points of each dioxolane fuel are in general lower than the conventional biodiesel fuels. Although 2-methyl-2-undecyl-1,3-dioxolane has a melting point comparable to the pour point of soy, palm, and jatropha-derived biodiesel, 2,4,5-trimethyl-2-undecyl-1,3-dioxolane and 2,4-dimethyl-2-undecyl-1,3-dioxolane have significantly lower melting points, consistent with extra chain branching.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Unless otherwise stated, any feature described herein can be combined with any aspect or any other feature described herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 40 to about 100 should be interpreted to include not only the explicitly recited limits of from about 40 to about 100, but also to include individual values, such as 55, 70, 85, etc., and sub-ranges, such as from about 50 to about 75 etc.

In describing and claiming the examples disclosed herein, the singular forms "a", "an", and "the" include plural referents unless the context clearly dictates otherwise.

What is claimed is:

1. A blended fuel consisting of:
   a dioxolane, selected from the group consisting of 2,4,5-trimethyl-2-undecyl-1,3-dioxolane, 2,4-dimethyl-2-undecyl-1,3-dioxolane, 2-methyl-2-undecyl-1,3-dioxolane, and combinations thereof; and
   a fuel, wherein the fuel is a petroleum-based diesel fuel or a biodiesel fuel.

2. The fuel of claim 1, wherein the dioxolane has a cetane number ranging from about 40 to about 100.

3. The fuel of claim 1, wherein the dioxolane has a freezing point ranging from about −60° C. to about 0° C.

4. The biodiesel fuel of claim 1, wherein the net heat of combustion ranges from about 110000 M/gal (30.6 MJ/L) to about (30.6 MJ/L) to about 130000 Btu/gal (36.2 MJ/L).

5. The blended fuel of claim 1, wherein the dioxolane is present in an amount ranging from about 1% to about 50% based on the total % of the blended fuel.

6. A blended fuel consisting of:
   a dioxolane, wherein the dioxolane is 2,4,5-trimethyl-2-undecyl-1,3-dioxolane; and a fuel, wherein the fuel is a petroleum-based diesel fuel or a biodiesel fuel.

* * * * *